United States Patent

[11] 3,618,654

[72] Inventor Forrest Clayton Meserve
 North Andover, Mass.
[21] Appl. No. 853,768
[22] Filed Aug. 28, 1969
[45] Patented Nov. 9, 1971
[73] Assignee Bandag Incorporated
 Muscatine, Iowa

[54] HIGH-SPEED CUTTING BLADE
 2 Claims, 3 Drawing Figs.
[52] U.S. Cl. .................................................. 157/13,
 29/95, 30/350, 83/671
[51] Int. Cl. .................................................. B29h 21/08,
 B26d 1/00, B26d 9/00
[50] Field of Search ...................................... 29/95, 103;
 157/13; 30/350, 356, 357; 83/671

[56] References Cited
 UNITED STATES PATENTS

| | | | | |
|---|---|---|---|---|
| 82,711 | 10/1868 | Grover | | 29/95 |
| 1,434,047 | 10/1922 | DeBats | | 30/350 X |
| 1,770,157 | 7/1930 | Humphries | | 30/357 X |
| 2,335,249 | 11/1943 | Hawkins | | 30/350 |
| 2,674,028 | 4/1954 | Kontra | | 29/95 |
| 2,741,307 | 4/1956 | Meserve | | 157/13 |
| 2,903,782 | 9/1959 | Cowley | | 29/103 |
| 2,950,523 | 8/1960 | Frommelt | | 29/103 |
| 3,409,965 | 11/1968 | Fisher | | 29/103 |
| 3,496,973 | 2/1970 | Ballard | | 30/350 X |

*Primary Examiner*—Harrison L. Hinson
*Attorney*—Kenway, Jenney & Hildreth

ABSTRACT: A blade for cutting plastic material such as tire stock, having a body of steel with a flat back surface with a segmental channel in one edge containing a ring of tungsten carbide or the like ground flush with the steel body on one side and projecting outwardly so that it is exposed on both sides and terminates in a circular cutting edge.

PATENTED NOV 9 1971　　3,618,654

INVENTOR
F. Clayton Meserve
BY
Kenway, Jenney & Hildreth
ATTORNEYS

HIGH-SPEED CUTTING BLADE

This invention comprises a blade of novel construction adapting it for cutting, slashing or siping elastomeric or plastic material in the form of sheets, strips or tire stock.

It has been found extremely difficult to sipe rubberized tire stock at any satisfactory rate of speed without overheating the cutting blade to the extent of damaging the blade and the siped stock. This is particularly true of tire stock containing glass fiber strands or other reinforcing components.

I have solved this long standing problem by the discovery of a new and improved blade formation that will operate smoothly and without overheating at a rate of as much as 1,200 feet per minute of rubber, making siping cuts one-quarter inch deep with one-quarter to one-half inch spacing. This is a most satisfactory performance under existing conditions of manufacture.

The blade of my invention is characterized by an arcuate steel body from which projects a cutting edge of tungsten carbide or other metallic carbide grinding composition. As herein shown the blade is preferably adapted to operate in a siping machine such as that shown in my prior U.S. Pat. Nos. 2,741,307 (or 2,924,267) wherein the tire stock is advanced for cutting or siping by engagement with a threaded drum. The cutting blade herein shown has a flat back surface so that it may run smoothly in contact with the threads of the feeding drum.

These and other features of the invention will be best understood and appreciated from the following description of a preferred embodiment thereof selected for purposes of illustration and shown in the accompanying drawings in which.

The blade 10 is shown as being arcuate or segmental in form and may be of any suitable high carbon steel preferably of blue temper. The blade may be 0.028 inch in thickness and is first surface ground to present one flat side. This is provided with a marginal rabbit forming the channel 11 which, for example, may be 0.005 × one-quarter inch in depth.

The channel 11 thus formed is now completely filled with tungsten carbide applied in powdered form in repeated passes of the flame of a torch. Thus is carbide built up in the form of a ring in layers 0.001 inch in thickness, one at a time. Having completely filled the channel 11 the tungsten ring 12 is now ground flush on one side with the flat surface of the blade body. The blade is now heated to a red heat thus braising and bonding the tungsten carbide ring to the body of the blade.

Figure 1:
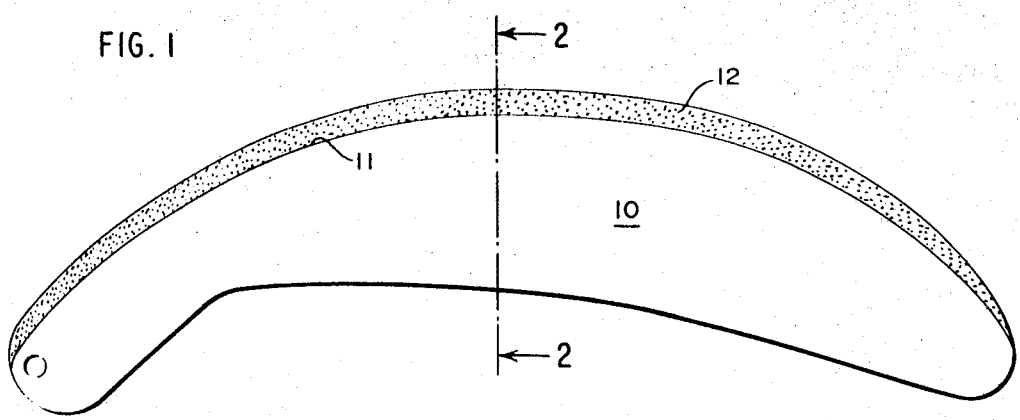
FIG. 1 is a view in elevation of the cutting blade.
Figure 2:
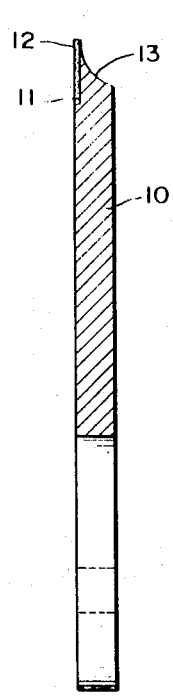
FIG. 2 is a view thereof in section on the line 2—2 of FIG. 1.
Figure 3:
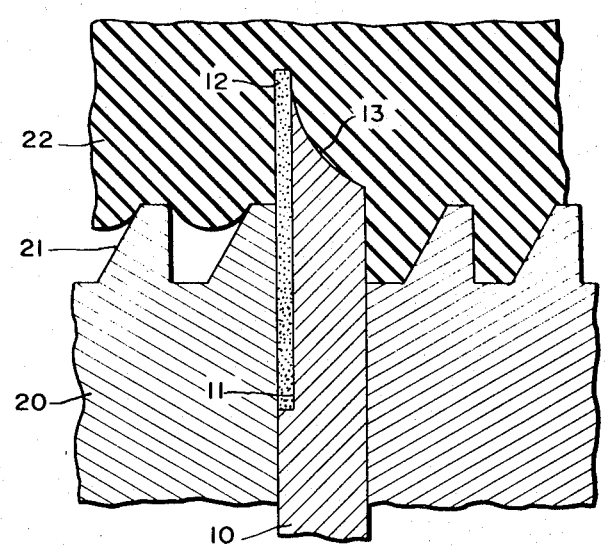
FIG. 3 is a fragmentary view showing the edge contour of the blade.

A marginal zone of the body 10 is now hollow ground as suggested in FIG. 3 to expose the other edge of the ring 12 by perhaps as much as one-sixteenth inch and in this operation the ring 12 terminates in a square cutting edge. The edge may be square or round, but preferably is of substantial width so that the bottom of the siping cuts made by it will have appreciable width as distinguished from a mere slit.

The composite blade herein shown is of general application but is specifically intended for use in siping machines of the character shown in the prior patent of Meserve and Smith U.S. Pat. No. 2,741,307, Apr. 10, 1956. Reference may be had to that patent for details of construction not herein shown.

In the accompanying drawings a portion 20 of the feed drum is shown as having helical buttress threads 21. These threads indent the stock 22 without cutting it and feed it transversely as shown in FIG. 3. The buttress teeth 21 have a smooth radial surface which may be disposed in contact with the composite rear surface of the blade itself. The axis of the drum 20 and the composite blade are set at the proper pitch angle so that the siping cuts coincide in spacing and helical direction with the pitch of the drum.

The blade is mounted in the drum between two sections thereof having mating helical surfaces and being held together by three large screws (not shown). The blade is pinned on one end between the drum sections, thus allowing the free end to be adjusted up or down or radically to cut any desirable depth. Preferably and as herein shown the tungsten ring portion of the blade is fully exposed beyond the carbon steel body of the blade.

The constant abrasion and wear on the softer base metal causes the hollow ground area to recede and leave the tungsten exposed as a cutting edge.

While tungsten carbide is the best edge-forming material, other cutting or grinding compositions would serve in the blade as equivalent components.

Having thus disclosed my invention what I claim as new and desire to secure by Letters Patent is:

1. A machine for siping tire stock or the like having a threaded feed drum and presser roll cooperating to advance the stock between them, in combination with a helical knife having an enlarged cutting end of hard metal and being mounted in the feed drum with a hollow ground surface disposed on the entrant side of the drum.

2. A machine for siping tire stock as defined in claim 1 wherein the buttress thread of the feed drum is defined on one side by a smooth radial surface which is arranged in contact with the entrant side of the drum and has an enlarged square cutting end portion.

* * * * *